April 7, 1964     H. K. HUGHES     3,128,386
RADIATION SENSITIVE LOW-TORQUE TRANSDUCER
Filed Sept. 22, 1959     3 Sheets-Sheet 1
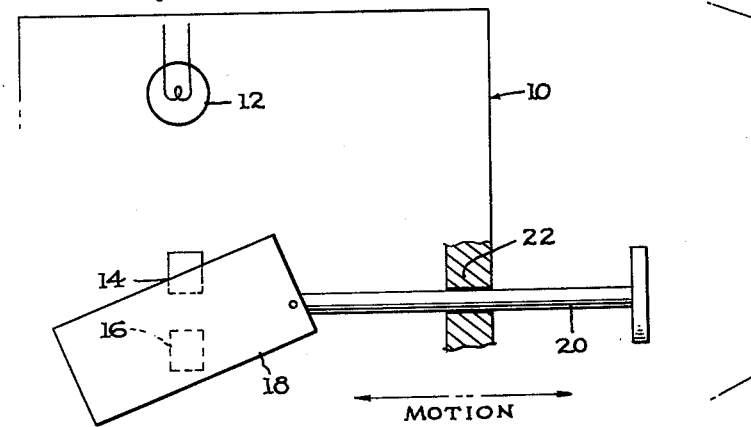
FIG. 1.
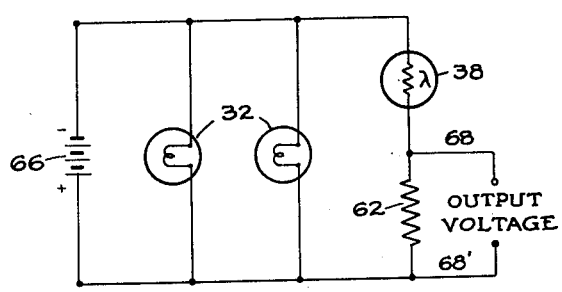
FIG. 7.
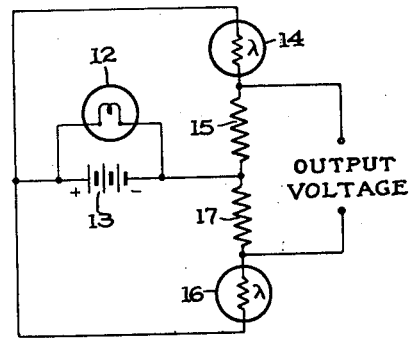
FIG. 6.
FIG. 2.
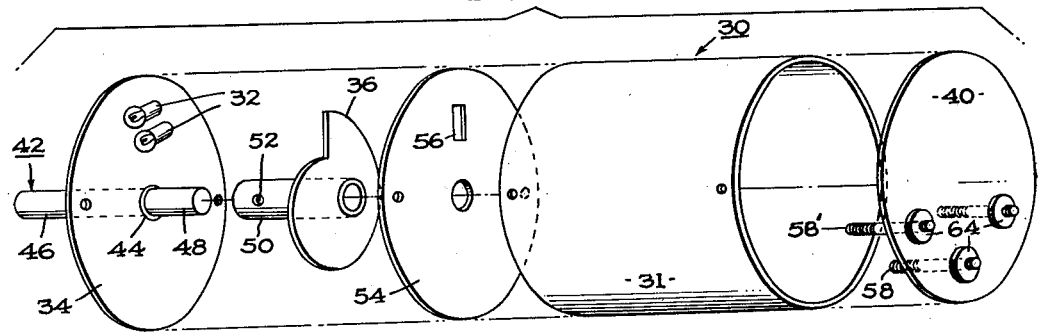
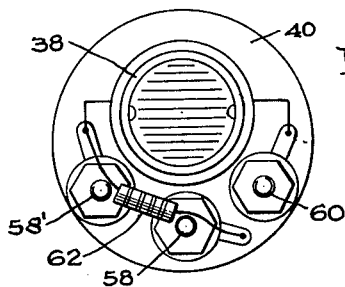
FIG. 2a.
INVENTOR
HAROLD K. HUGHES
BY Lawrence I. Field
ATTORNEY April 7, 1964  H. K. HUGHES  3,128,386
RADIATION SENSITIVE LOW-TORQUE TRANSDUCER
Filed Sept. 22, 1959  3 Sheets-Sheet 2
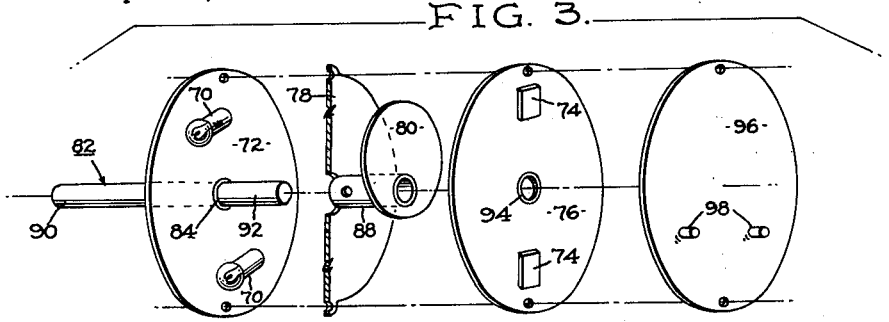
FIG. 3.
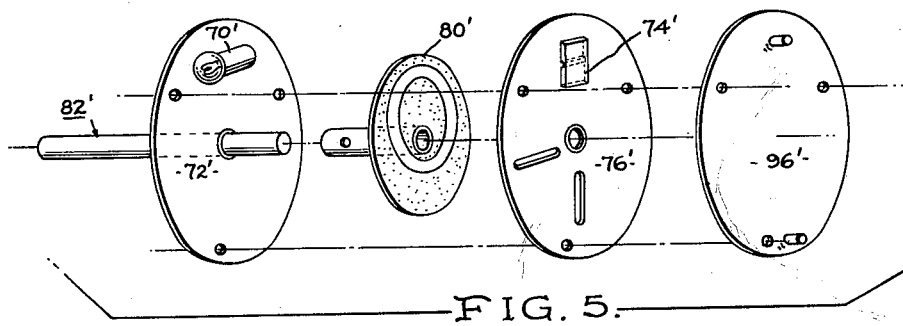
FIG. 5.
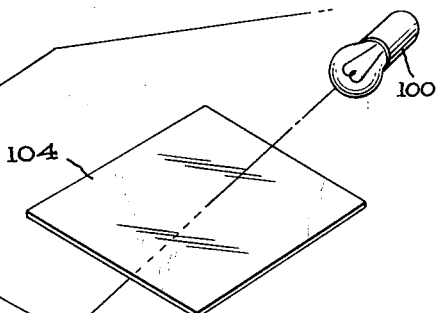
FIG. 4.
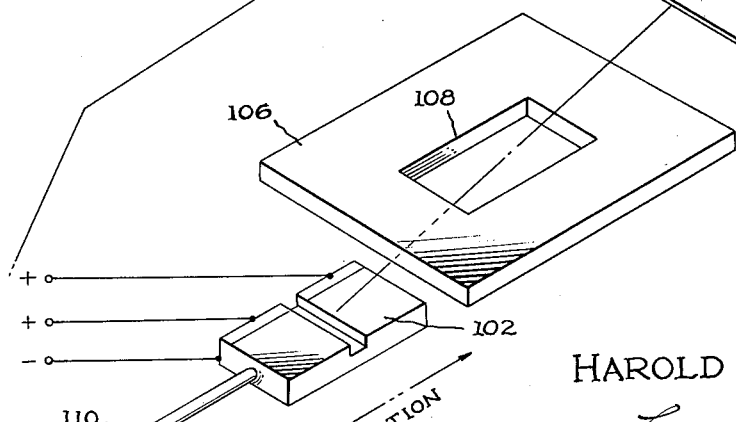
INVENTOR
HAROLD K. HUGHES
BY *Lawrence I. Field*
ATTORNEY April 7, 1964 H. K. HUGHES 3,128,386
RADIATION SENSITIVE LOW-TORQUE TRANSDUCER
Filed Sept. 22, 1959 3 Sheets-Sheet 3

INVENTOR
HAROLD K. HUGHES
BY Lawrence I. Field
ATTORNEY

United States Patent Office 3,128,386
Patented Apr. 7, 1964

1

3,128,386
RADIATION SENSITIVE LOW-TORQUE
TRANSDUCER
Harold K. Hughes, 98—20 62 Drive, Rego Park, N.Y.
Filed Sept. 22, 1959, Ser. No. 841,573
8 Claims. (Cl. 250—237)

This invention relates to an improved transducer and more particularly to a low-torque or low-force device for converting a mechanical input to an electrical output.

In a preferred form, the device comprises an apparatus in a light-tight enclosure wherein light from one or more sources is attenuated in a definite manner and the attenuated light is then received on a photosensitive target to produce an output signal representative of the mechanical input.

One object of the invention is to provide a transducer having essentially no contact resistance, no eddy currents, no sparking and virtually no wear due to moving parts.

Another object is to provide a mechanical-electrical transducer whose only moving part may be so mounted on a primary sensing element, such as a gyroscope or pressure gage, that no additional torque or force is transmitted to the sensing element.

A further object is to provide a device from which both simple linear and complex function outputs may be readily and interchangeably obtained, and one having a rapid response.

Still a further object of the invention is to provide a transducer wherein the output may be safety shorted out and wherein there is virtually no limitation on the rate of change of function.

Still another object of the invention is to provide a transducer which is both rugged and compact and which produces an electrical output which can be utilized in many practical devices, particularly those where the mechanical motion is minute, for example devices involving movements of 0.1 inch or less.

These and other objects will appear from the description which follows and from the drawings showing various embodiments of the invention, in which FIGURE 1 is a schematic view of a simple transducer, wherein a rectilinear movement is the cause of a change in an electrical output from the device;

FIGURE 2 is an exploded schematic view of a rotary device, wherein angular movement is the cause of an alteration in an electrical output;

FIGURE 2a is a detail of FIGURE 2;

FIGURE 3 is an exploded view showing a more complex rotary device;

FIGURE 4 is a schematic view showing another form of rectilinear device;

FIGURE 5 is a view showing another rotary transducer;

FIGURE 6 is a circuit for the device of FIGURE 1;

FIGURE 7 is a circuit for the device of FIGURE 2;

Figure 8:
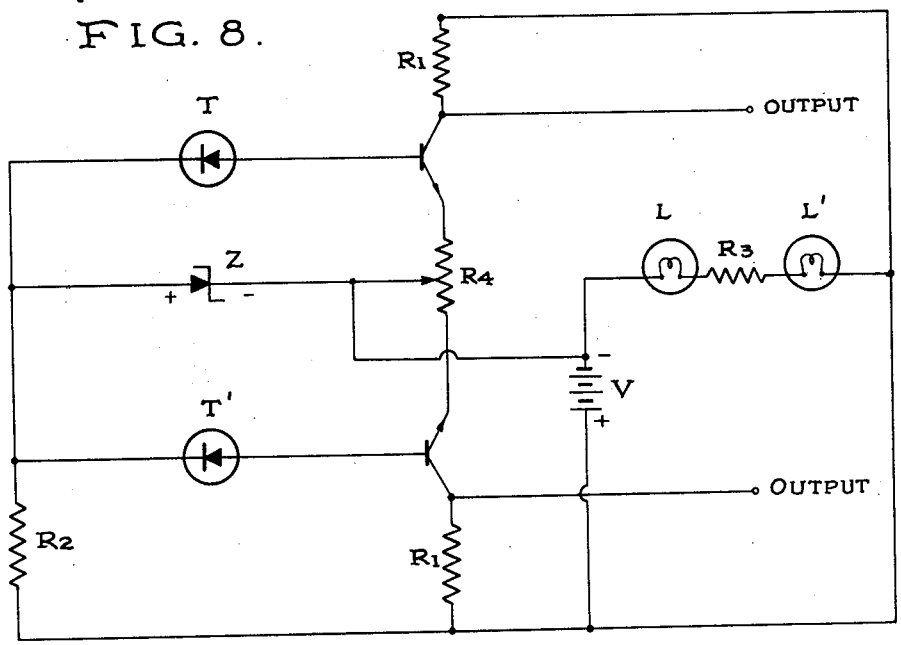
FIGURE 8 is a circuit for the devices of FIGURES 3, 4 and 5.
Figure 9A:
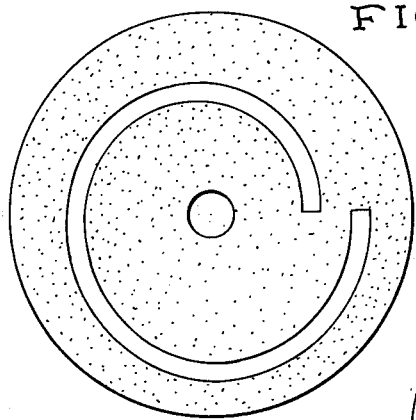
FIGURES 9a, 9b, 9c and 9d show some of the forms the mask may assume in rotary devices and represent respectively mask configurations for linear push-pull output, sine-cosine push-pull output, a single-sided sine-cosine transducer and a single-sided linear transducer.
Figure 9B:
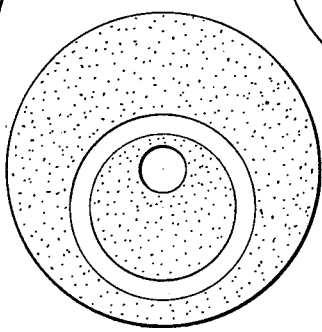
Figure 9C:
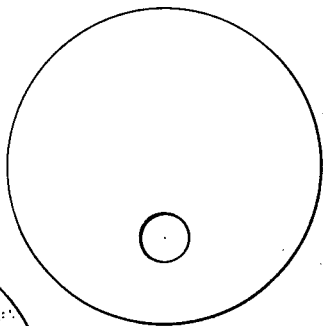
Figure 9D:
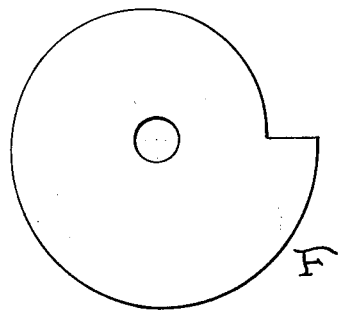

As shown in FIGURE 1, the device in its simplest form comprises a light-tight container 10 wherein there is positioned a suitable source of radiation such as light source 12. Also housed in the light-tight container are two light-sensitive targets 14, 16 and a means 18 interposed between the light source and the targets for controlling the amount of light received by each of the targets. In the device shown, the targets are preferably photocells

2 and the means 18 is a simple flat mask. The mask 18 is supported for movement by a shaft 20 guided in bearing 22. In operating the device, the shaft 20 is moved back and forth so that the mask progressively covers one photocell target while uncovering the other. The movement of the shaft is then converted to an electrical output by the circuit of FIG. 6.

FIGURE 6 shows one circuit for the device of FIGURE 1. In the circuit, the source of radiation is shown as lamp 12 energized by a suitable source of potential 13. Any suitable source of radiation may be used, provided it is matched to the detectors. In the circuit of FIGURE 6, the detectors are the photocell targets 14 and 16 of FIGURE 1. Load resistors 15 and 17 complete the circuit, except for a voltmeter or other output signal receiving device, which is not shown.

By way of a specific example, in FIGURE 6, the source of radiation may be a 120-volt, 6-watt lamp or any of the other sources hereinafter described. The detectors are matched to the source of radiation and for the 6-watt lamp, they may be miniature photoconductive Cds type photocells such RCA 6694–A.

For an applied voltage of 90, the output voltage may be made to vary linearly from about —80 volts to +80 volts, or over a somewhat wider range, when the the load resistors R are each 100,000 ohms.

A push-pull circuit, such as shown in FIGURE 6, is preferred because the output voltage is higher and because variations in applied voltage and variations in ambient temperature are better compensated. It should be understood, however, that a single-sided circuit and other circuit variations can also be employed in this example and in the other examples subsequently described herein without departing from the intended scope of this invention.

In the device shown in FIGURE 2 a light-tight housing 30 includes a tubular section 31. Enclosed within tube 31 is a source of radiation, shown as a plurality of lamps 32 supported on a disc 34 adapted to be secured to one end of the housing and to serve as one end closure for the tube 31. A means for diffusing and attenuating the radiation consists of a diffuser (not shown) and a mask 36, both positioned between the radiation source 32 and a suitable target, shown as a photoresistive cell 38. Target 38 is suitably supported on a disc 40 which serves as the other end closure for the light-tight housing tubular section 31. This is best seen in FIGURE 2a, a view of the inner side of disc 40. Mask 36 is supported for rotation by a shaft 42 positioned in a bearing 44, mounted at the central axis of end closure 34. Shaft 42 has an outwardly extending stub portion 46 adapted to be connected to the mechanical input and an inwardly extending stub portion 48 adapted to receive a collar 50 secured to the mask 36, so as to support the mask for rotation. A set screw (not shown) passes through a hole 52 in collar 50 to secure the collar to the shaft 42. Stub shaft 48 extends into an axially located opening in a disc 54 which serves as a screen to limit the radiation falling on target 38 to that radiation which passes through one or more slits 56 cut in the body of disc 54. Disc 54 is rigidly fixed to the inside of tubular section 31 by any suitable mounting means. As seen in FIGURE 2a, disc 40 supports a plurality of terminal posts 58, 58', 60 to which the photoresistive cell 38 and load resistor 62 are connected by suitable leads within the light-tight housing. The usual, screw caps 64, are provided on the outwardly projecting extensions of the terminal posts.

In the operation of the rotary transducer of FIGURE 2, angular rotation of shaft 42 in bearing 44 causes mask 36 to alter the amount of radiation from the lamps 32 permitted to fall upon target 38. As described further below, the relationship between the output voltage and the mechanical rotary movement of shaft 42 may be any arbitrary, periodic function, as determined by the shape of the mask 36.

A suitable circuit diagram for the device of FIGURE 2 is shown in FIGURE 7. As shown in FIGURE 7, the radiation source 32 of FIGURE 2 is energized by suitable means, indicated as an applied voltage 66, connected across the lamps and also across a branch in which the target 38 and load resistor 62 are connected in series. An output signal is obtained through leads 68 and 68' extending from either end of the load resistor.

A specific embodiment of the rotary transducer shown in FIGURE 2 was constructed in which the radiation source was a pair of miniature tungsten lamps, General Electric No. 334, the photocell was a CdS RCA 7163 and the resistance 62 was 24,000 ohms. The rotating mask, over a fixed slit, was in the shape of an Archimedes spiral, corrected for the non-linearity of the photocell. With an applied voltage of 15, the output voltage varied from zero to about 9 volts in a dependence upon the rotation of the mask that was linear to within 2.3% of the applied voltage.

FIGURE 3 depicts schematically still another modification of the transducer. In this modification, radiation from two lamps passes through one or more diffusers and is attenuated by a mask and slit, and then falls upon two photocells. The pairs of lamps and cells are displaced by 180° so that as the radiation falling upon one cell increases with rotation of the mask, the radiation falling upon the other cell decreases.

For clarity the light-tight enclosure and electrical connections have been omitted from the exploded view showing in FIGURE 3. In the device shown, the radiation source is a pair of lamps 70, suitably mounted on a disc 72 so as to emit radiation toward a target, shown as a pair of solar cells 74 supported on a disc 76. Between the lamps 70 and targets 74, there are positioned a diffuser 78, shown in section, and a mask 80. Small rectangular slits are cut in disc 76 under cells 74. A shaft 82 mounted in a bearing 84 is adapted to pass through an axial bore in disc 72 and through a collar 88 supporting the mask 80. One extremity 90 of shaft 82 extends outwardly of disc 72 and is adapted to connect to a mechanical input. The opposite extremity 92 is received in a bearing 94 mounted in the central axis of disc 76. The diffusion screen 78 may be mounted directly fixed to the housing, or secured by long bolts (not shown) rigidly securing disc 72 and disc 76 to an end closure disc 96. Suitable terminals 98 are mounted on disc 96. The output signal is conducted by suitable means electrically connecting the output of solar cells 74 with the terminals 98 on cap 96.

FIGURE 4 is an exploded view showing features of a transducer wherein rectilinear motion is converted to an output in the form of an electrical signal which is some function of the mechanical (motion) input. In the device shown, radiant energy from a suitable source 100 is permitted to fall on a duplex cell 102 which is mounted for reciprocal movement into and out of the path of the radiant energy derived from source 100. The radiation is further influenced by a diffusing screen 104 mounted between the source 100 and target 102 and by a mask 106 which is provided with one or more suitably located slits 108.

A model transducer constructed according to FIGURE 4 had an electrical output that was linear with the applied mechanical input to better than 1%.

The duplex cell of FIGURE 4 is a Hoffman silicon solar cell, type 51C, through the P-layer of which a very thin cut was made by a Carborundum wheel. This converts the cell into two independent cells with a common negative connection to the back. By this means, one lamp and one cell are eliminated and the construction is made still more symmetrical for greater compensation of variations in temperature and applied voltage.

FIGURE 5 is an exploded view of a rotary device utilizing a duplex photocell such as the one described above. The devices of FIGURES 3 and 5 are similar except for the use of a single duplex target in place of the two solar cells 74 of FIGURE 3 and the use of a single radiation source in place of lamps 70 and the shape of the mask. Consequently, elements of FIGURE 5 have been designated by primed numerals corresponding to similar elements in FIGURE 3.

FIGURE 8 shows a circuit suitable for the devices of FIGURES 3, 4 and 5, when properly modified as required to adapt it to each of the three specific modifications shown. In the circuit, the radiation source, shown as two lamps L and L' series connected with a resistor R–3 between them, is energized by a suitable source of potential, V, which may be a 30-volt supply.

Radiation from each of the lamps falls on photosensitive targets T and T' respectively, which are connected to the bases of suitable transistors, such as Transitron ST 45 (npn). The other side of the photosensitive targets are connected to a branch containing a load resistor, $R_2$ and Zener diode Z.

The emitters of the two transistors are connected through a 200-ohm potentiometer, $R_4$, which balances the circuit. Zener diode Z biases the transistors into their linear region.

The collector of each of the two transistors is connected to similar load resistors $R_1$, and to leads extending to the terminals whence the output signal is taken off. Radiation falling on targets T and T' causes them to generate currents proportional to the amount of radiation and in such a direction that the base of the associated transistor is thereby made more positive. Adjustment of the mask increases the radiation on one target and simultaneously decreases it on the other target. This has the effect of increasing the collector current in one transistor and decreasing it in the other, thereby producing an unbalance in the currents through resistors $R_1$. This unbalance appears as an output voltage on the two terminals labeled "output."

A model of a cosine transducer of the type depicted in FIGURES 3 and 8 was constructed in a light-tight cylindrical case approximately 1½ inches in diameter and 1 3/16 inches long in which the lamps were General Electric No. 344, the diffusers were translucent paper, the mask was approximately an eccentric circle and the photocells were Hoffman 51C silicon solar cells. The transistors were silicon npn type, Transitron ST 45, which match the temperature response of the solar cells; the load resistors used were $R_1$ 7500 ohms, resistance $R_2$ 39,000 ohms. Resistance $R_3$ was a high positive-temperature-coefficient resistor, Texas Instruments 500-ohm Sensistor, employed for further temperature compensation. The circuit is balanced with potentiometer $R_4$ and the diode used was a Transitron SG 22.

FIGURE 8 is also a suitable circuit for use with the device of FIGURE 4, except that only one source is used.

For the rotary transducer utilizing a duplex photocell depicted in FIGURE 5, the circuit of FIGURE 8 is again suitable except that as in the device of FIGURE 4, only one radiation source is employed. Light from the source passes through a diffuser, not shown, and is controlled by the mask and by a fixed slit. It then falls on the duplex light sensitive cell. As the mask turns, it progressively allows more light to fall on one-half of the cell while simultaneously reducing the fraction of light falling on the other half of the cell.

It will be understood that in each of the foregoing specific embodiments virtually any radiation source may be employed, provided that the target is selected from a suitable material, matched to the radiation source. For example, the source may be an ordinary lamp, preferably a miniature light bulb, or it may be an infrared source, an ultraviolet source, a glow discharge tube, a radioactive source, a light source activated by a radioactive isotope, a lumescent sheet, or even an X-ray emitter.

The radiation-sensitive target is preferably a silicon photo-voltaic cell, commonly referred to as a solar cell, but photojunction diodes made of silicon or germanium, CdS or CdSe photoconductive materials, and photoelectric cells have been successfully used as the sensitive targets in devices made according to the present invention. Still other detectors may be employed, such as Geiger counters and the like.

The choice of target depends in part on the nature of the radiation furnished by the source and in part on the desired speed of response.

Between the source and the target there is interposed an attenuating means. In practice and in the several specific devices described above I have found it preferable to alter the radiation on the detector by the use of a moving mask in cooperation with a fixed slit. Such means for attenuating the radiation transmitted to the target offers certain advantages inasmuch as it may be given any suitable and precise configuration by various photographic and mechanical techniques and it may be either translucent or opaque. The conformity of the transducer appears to be principally dependent upon the care with which the mask and slit are made.

Still other more sophisticated attenuating means may be used. For example, to obtain an exponential output, a wedge of tinted glass may be moved into the path between the source and the detector, to alter the amount of radiation falling on the target. Furthermore, Ronchi rulings and prisms or similar devices may also be employed. If desired, the sides of the prism may be curved or otherwise shaped to produce the desired relationship between the fraction of radiation transmitted and the movement of the prism. The prism is not restricted to glass; transparent plastic or various colored liquids in transparent containers may likewise be employed. It is also possible to attenuate the radiation by rotating a pair of Nicol prisms or Polaroid filters with respect to each other in which case the relationship is a cosine-squared function.

With the devices of FIGURES 1 and 4 the moving mask may consist simply of a suitably shaped slit. This may have straight and parallel sides for a linear transducer or shaped sides for a non-linear relationship. With the devices of FIGURES 2, 3 and 5, the configuration of the mask determines the characteristics of the output. For a linear transducer, the moving mask is an Archimedes spiral; for a sine-cosine transducer, the mask is a modified eccentric circle, and for other nonlinear outputs, other suitable masks may be readily devised.

In FIGURE 9, several mask configurations are shown by way of illustrating some of the almost infinite possibilities. By making the mountings interchangeable, and then changing masks, it will be apparent that the device is adapted to provide a means for going from one type of output function to another with a minimum of rebuilding.

In the several devices described above, no lenses or other refracting elements have been included between the source and the target. It will, of course, be evident that conventional optical means may be provided to focus or otherwise direct the radiation in any of the well-known ways. Likewise gears may be added to adjust the relationship between the shaft and mask.

I claim:

1. A device for producing an electrical signal output which is a predetermined function of a shaft position, comprising in combination, in a suitable radiation-impervious housing: a radiation source; a radiation-sensitive target positioned so as to receive a portion of the radiation from said source and for producing an electrical signal output in response to said radiation; a movable shaft operatively connected to a movable mask for partially interrupting radiation passing from said source to said target, said mask being configured in accordance with a preassigned function and which in response to motion of said movable shaft member attenuates the radiation from said source reaching said target by passing a shadow of said movable mask across said radiation sensitive target which shadow moves across said target in a direction generally perpendicular to the direction of motion of said movable mask; and a fixed radiation barrier positioned adjacent to said movable mask and between said radiation source and said target, said barrier containing an aperture through which said radiation passes enroute to said target, whereby the electrical signal output of said device is the intended function of said shaft position.

2. A device for producing an electrical signal output which is a predetermined function of a shaft position, comprising in combination, in a suitable radiation-impervious housing: a light source; a light-sensitive target positioned so as to receive a portion of said light and for producing an electrical signal output in response to said light; a movable shaft operatively connected to a movable mask for partially interrupting light passing from said source to said target, said mask being configured in accordance with a preassigned function; and a light diffuser and a fixed opaque member containing an aperture through which the light passes enroute to the target, whereby the electrical signal output of said device is the intended function of said shaft position.

3. A device for producing an electrical signal output which is a predetermined function of a shaft position, comprising in combination, in a suitable radiation-impervious housing: a radiation source; a radiation-sensitive target positioned so as to receive a portion of the radiation from said source and for producing an electrical signal output in response to said radiation; a fixed opaque mask containing an aperture, said mask being interposed between said source of radiation and said target and being adapted to confine the radiation transmitted from said source to a specific region of said target; a movable shaft operatively connected to a movable mask for partially interrupting radiation passing from said source to said target, said mask being configured in accordance with a preassigned function and which in response to motion of said movable shaft member attenuates the radiation from said source reaching said target by passing a shadow of said movable mask across said radiation sensitive target which shadow moves across said target in a direction generally perpendicular to the direction of motion of said movable mask; and means to modify the electrical output of said target, whereby the electrical signal output of said device is the intended function of said shaft position.

4. A device for producing an electrical signal output which is a predetermined function of a shaft position, comprising in combination, in a suitable radiation-impervious housing: a radiation source; a radiation-sensitive target positioned so as to receive a portion of the radiation from said source and for producing an electrical signal output in response to said radiation; a fixed opaque mask containing an aperture, said mask being interposed between said source of radiation and said target and confining the radiation transmitted from said source to a specific region of said target; a movable shaft operatively connected to a movable mask for partially interrupting radiation passing from said source to said target, said mask being configured in accordance with a preassigned function and which in response to motion of said movable shaft member attenuates the radiation from said source reaching said target by passing a shadow of said movable mask across said radiation sensitive target which shadow moves across said target in a direction generally perpendicular to the direction of motion of said movable mask; and means to amplify the electrical output of said target, whereby the electrical signal output of said device is the intended function of said shaft position.

5. A device for producing an electrical signal output which is a predetermined function of a shaft position, comprising in combination, in a suitable radiation-impervious housing: means for irradiating two radiation-sensitive targets so positioned that each receives a portion of the radiation from said means and for producing electrical signal outputs in response to said radiation; a fixed opaque mask containing an aperture, said mask being interposed between said source of radiation and said targets and confining the radiation transmitted from said source to a specific region of said targets; a movable shaft operatively connected to a movable mask for partially interrupting said radiation passing to said targets, said mask being configured in accordance with a preassigned function and which in response to motion of said movable shaft member attenuates the radiation from said source reaching said targets by passing a shadow of said movable mask across said radiation sensitive targets which shadow moves across said targets in a direction generally perpendicular to the direction of motion of said movable mask so that as the radiation falling on one target increases with movement of the shaft the radiation falling on the second target decreases; and means for combining said output signals whereby the combined electrical signal output of said device is the intended function of said shaft position.

6. A device for producing a plurality of electrical signal outputs which are predetermined functions of a shaft position, comprising in combination, in a suitable radiation-impervious housing: means for irradiating a plurality of radiation-sensitive targets so positioned that each receives a portion of radiation from said means, and for producing electrical signal outputs in response to said radiation; a fixed opaque mask containing an aperture, said mask being interposed between said source of radiation and said targets and confining the radiation transmitted from said source to a specific region of said targets; a movable shaft operatively connected to a movable mask for partially interrupting said radiation passing to said targets, said mask being configured in accordance with preassigned functions so that the phases of said signal outputs of said targets with respect to the rotation of said shaft, are predetermined, said movable mask attenuating the radiation from said source permitted to reach said targets by passing a shadow of said movable mask across said targets which shadow moves across said targets in a direction generally perpendicular to the direction of motion of said movable mask; and an output circuit for receiving electrical output signals from targets selected from said plurality in combining relation, whereby the electrical signal outputs of the device are the intended functions of said shaft position.

7. A device for producing an electrical signal output which bears a predetermined functional relationship to the position of a movable shaft member relative to a fixed member and which comprises in combination, in a housing impervious to radiation:

(1) a source of radiation;
(2) a radiation-sensitive target, positioned so as to receive at least a portion of the radiation from said source, and producing an electrical signal output in response to that portion of said radiation received thereon;
(3) a fixed mask interposed between said source of radiation and said target, said mask having a single aperture, located so as to limit the portion of the radiation from said source received on said target to a specific region of the surface of said target;
(4) a movable shaft member; and
(5) a movable mask operatively connected to said shaft member, configured in accordance with a preassigned function and which in response to motion of said movable shaft member attenuates the radiation from said source permitted to reach said target by passing a shadow of said movable mask across said radiation sensitive target which shadow moves across said aperture in said fixed mask in a direction generally perpendicular to the direction of motion of the movable mask, whereby the electrical signal output of said device is the intended function of said movable shaft member.

8. The device of claim 7 wherein the source of radiation is a light and the housing is light-tight.

References Cited in the file of this patent
UNITED STATES PATENTS

| | | |
|---|---|---|
| 2,586,540 | Holden | Feb. 19, 1952 |
| 2,640,866 | Powell | June 2, 1953 |
| 2,756,930 | Pelsor et al. | July 31, 1956 |
| 2,788,519 | Caldwell | Apr. 9, 1957 |
| 2,796,598 | Cartwright | June 18, 1957 |
| 2,896,086 | Wunderman | July 21, 1959 |